UNITED STATES PATENT OFFICE.

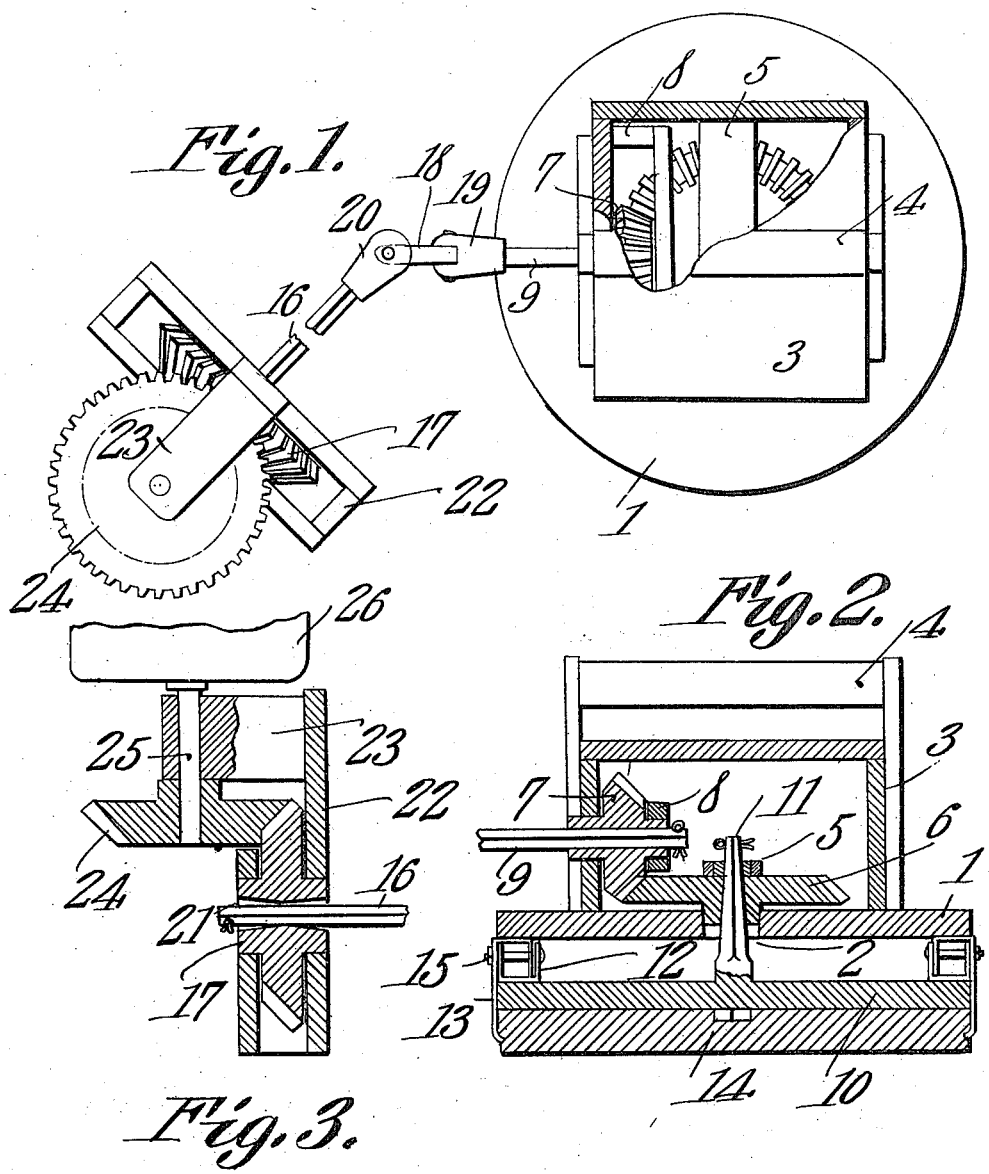

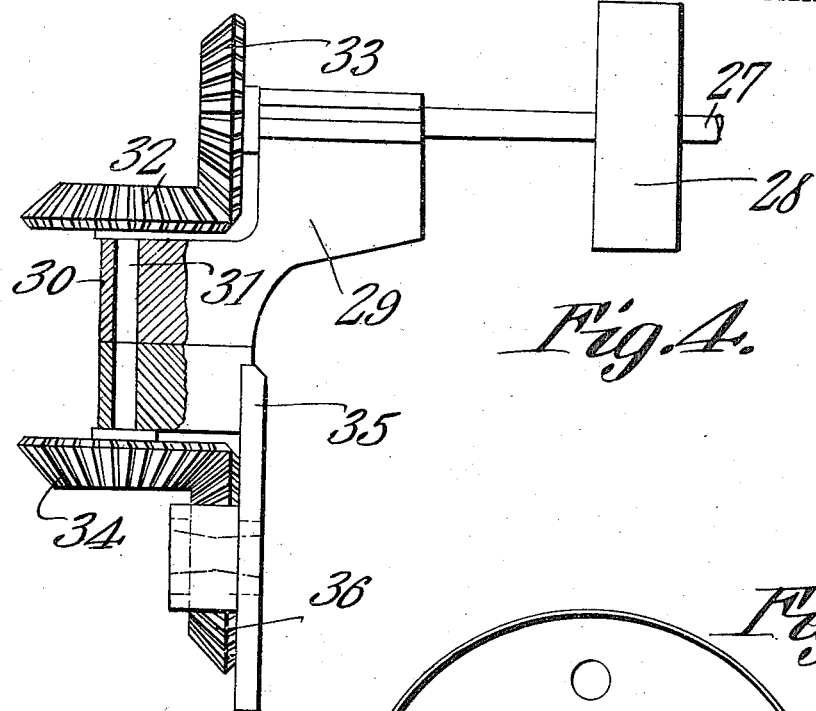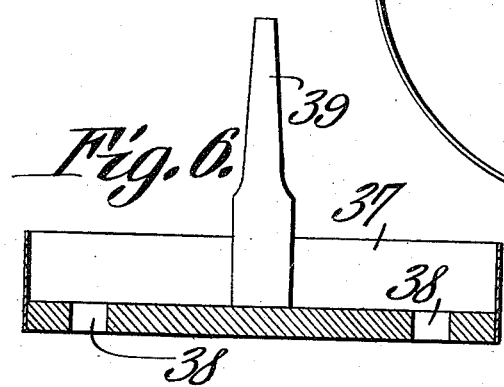

JOHN G. GIESBERG, OF HOUSTON, TEXAS.

POLISHING-MACHINE.

964,101.  Specification of Letters Patent.  Patented July 12, 1910.

Application filed September 2, 1909. Serial No. 515,815.

*To all whom it may concern:*

Be it known that I, JOHN G. GIESBERG, a citizen of the United States, residing at Houston, in the county of Harris and State of Texas, have invented a new and useful Polishing-Machine, of which the following is a specification.

My invention relates to improvements in polishing machines and the object of the invention is to provide a simple and efficient device which may be operated easily in any position and by which the surfaces of blocks or slabs of glass, marble or other hard substances will be easily and highly polished.

This object is attained by the use of the apparatus illustrated in the accompanying drawings and the invention consists in certain novel features of the same as will be hereinafter first fully described and then specifically stated in the appended claims.

In the drawings, Figure 1 is a plan view partly broken away, of an apparatus embodying my invention. Fig. 2 is a vertical section of the rubber or polishing head. Fig. 3 is a detail section of a portion of the driving gearing. Fig. 4 is a view partly in section and partly in elevation of a modified form of driving gearing. Fig. 5 is a plan view of a form of rubber different from that illustrated in Fig. 2, and Fig. 6 is a transverse section of the rubber shown in Fig. 5.

In carrying out my invention I employ a rubber or polishing head consisting of a disk 1 having an opening 2 at its center, upon which is mounted a housing 3 having a cross bar or handle 4 on its upper side, by means of which the rubber may be moved over the surface to be treated, as will be readily understood. Within the housing 3 and upon the disk 1, I secure a bracket 5 within which a beveled pinion 6 is confined, the bore of the said pinion registering with the opening 2 in the disk 1, and the hub of the pinion being journaled in said opening as clearly shown in Fig. 2. This pinion 6 meshes with a smaller pinion 7 which is journaled in the side of the housing 3 and a bracket 8 secured therein. One end, 9, of the driving shaft is fitted in the bore of the pinion 7 and has an angular engagement therewith so that the rotation of the shaft will be imparted directly to the pinion and through the same transmitted to the beveled pinion 6 and the rubber head engaged thereby.

In Fig. 2, the rubber head is shown as comprising a backing disk 10 which may be of any preferred material and from the center of which a tapered spindle 11 rises through the opening 2 in the disk 1 and the bore of the pinion 6 so as to firmly engage and bind in the said bore. On the upper side of the disk 10, at diametrically opposite points of the same, I secure U-shaped brackets 12 and to the said brackets I secure clips 13 which are adapted to extend down past the edge of the disk 10 and have their lower ends fitted to or engaged in a polishing plate 14 of carborundum. The lower ends of the clips, in the construction illustrated, are turned inward so as to engage notches or sockets in the edge of the carborundum polishing plate and the upper ends of the clips are turned inward over the edges of the outer ends of the brackets 12 and are then turned downward so as to bear against the inner wall or side of the said brackets, as clearly shown in Fig. 2. A fastening bolt 15 is then inserted through the sides of the brackets and the clips so as to firmly secure the several parts together. It will be readily seen that this construction provides a light and secure fastening and that the upper portion of the clip bears firmly against the faces of the bracket so as to be reinforced and supported by the same.

Should it be desired to replace the plate 14 after the same has been worn down, the bolts 15 are loosened and the clips 13 then moved slightly from the edge of the rubbing plate so that the worn plate may be easily slipped out and the new one inserted in a very few minutes.

The driving shaft will be quite long and its upper or outer end 16 is mounted in the axial bore of a beveled wheel 17 so as to be capable of sliding through the said bore, but will have an angular engagement with the same so that the rotation of the gear will be imparted to the driving shaft and consequently transmitted to the pinions 7 and 6, as before stated. The sections 9 and 16 of the driving shaft are connected by a universal joint consisting of a link 18 having its opposite ends pivoted to heads 19 and 20, secured respectively to the meeting ends of the sections 9 and 16 of the driving shaft so that the necessary flexibility of the driving shaft will be provided to accommodate the same to the movement of the rubber over a surface being treated. The beveled gear 17 has its bore flared from its center toward its opposite ends, as shown at 21 in Fig. 3, and the said pinion is journaled in a suitable bracket or other support 22 having an arm 23 in which is mounted a beveled pinion 24 meshing with the pinion 17 and carried by a power shaft 25 journaled in the end of the said arm 23 and equipped, in the arrangement illustrated in Fig. 3, with an electric motor which is indicated at 26 in the said figure.

The use of the device will be readily understood. The polishing plate is secured to the disk 1, so as to be carried thereby, by having its spindle inserted through the opening 2 and wedged in the bore of the pinion 6. The operator then grasps the handle 4 of the rubber and by means of the same holds the plate 14 in contact with the surface to be polished and moves the same over the said surface to any desired point as the work progresses. The motor 26 being started, the power shaft 25 will be rotated and the rotation of the same transmitted through the pinions 24 and 17 to the driving shaft through which it will be imparted to the pinion 7 and thence to the pinion 6 which will, of course, rotate the rubber head. The polishing plate 14 will thus be rapidly rotated as it is moved over the surface of the block or slab and by its frictional contact therewith will rapidly impart a high polish to the said surface.

The arrangement illustrated in Figs. 1, 2 and 3 is preferred by me, inasmuch as it is simple and is adapted to any conditions requiring portability in the polishing apparatus, as for instance, polishing the marble walls of buildings. It may, however, be desired to employ the invention in places in which a fixed driving gear of high power would be more desirable and to meet these conditions I employ the gearing illustrated in Fig. 4 in which the power shaft 27 is equipped with a band pulley 28 and is mounted in a bracket or frame 29 having a horizontal arm 30 in which a vertical transmission shaft 31 is journaled, beveled gears 32 and 33 being provided on the ends of the said shafts to transmit the motion of the power shaft to the transmission shaft. On the lower end of the shaft 31 is a pinion 34 and above the said pinion a bracket 35 is swiveled upon the shaft. This bracket 35 is capable of moving around the shaft 31 to any desired angle with the bracket 29 and carries a beveled gear 34 having its bore of the same double conical formation as the bore of the pinion 17, illustrated in Fig. 3. The driving shaft is mounted in the said bore of the beveled gear 36 and extends from the same to the rubber, as will be readily understood. In Figs. 5 and 6 I have shown a form of rubber which is particularly adapted for polishing rough stone and consists of a box 37 having perforations 38 in its bottom and provided with a central tapered spindle 39 adapted to engage the bore of the pinion 6 within the housing of the rubber. In the use of this rubber the box is filled with sand, and water is permitted to flow through the same or over the surface of the stone being treated and the box is rotated in the same manner as the plate 14 is rotated in the form illustrated in the other figures. The sand will flow through the perforations 38 onto the stone and will wear the same smooth, as will be readily understood.

My device is simple in its construction; the arrangement of its parts may be readily operated in any desired position, and will occupy but little space when in use.

Having thus described my invention, what I claim is:

1. The combination of a housing, gearing therein, a flexible driving shaft connected to said gearing, a motor, and a gearing actuated directly by the said motor and having a slidable connection with the said flexible driving shaft.

2. The combination of a disk, upstanding brackets on the upper side of said disk, clips resting upon the tops and bearing against the walls of the bracket and secured thereto and depending therefrom below the edge of the disk, and a polishing plate carried by the lower ends of said clips.

3. The combination of a disk, U-shaped brackets secured upon and rising from the top thereof, U-shaped clips extending over and resting upon said brackets and bearing against the outer faces of the walls of the brackets, one leg of each clip depending below the disk, securing bolts inserted through the clips and the brackets, a polishing plate held by the depending ends of the clip, and means for rotating the disk.

In testimony that I claim the foregoing as my own, I have hereto affixed my signature in the presence of two witnesses.

JOHN G. GIESBERG.

Witnesses:
J. S. HENDERSON,
C. WALKER.